(No Model.)
A. PULBROOK
INFLATABLE TIRE.
No. 564,763. Patented July 28, 1896.
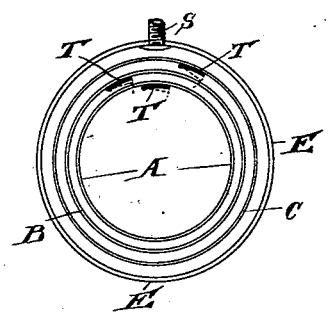
Witnesses.
H. van Oldenneel
E. A. Scott
Inventor.
Anthony Pulbrook
by Richards & Co.
Attorneys

UNITED STATES PATENT OFFICE.

ANTHONY PULBROOK, OF LONDON, ENGLAND.

INFLATABLE TIRE.

SPECIFICATION forming part of Letters Patent No. 564,763, dated July 28, 1896.

Application filed November 6, 1895. Serial No. 568,098. (No model.) Patented in France April 3, 1894, No. 237,516; in Belgium April 6, 1894, No. 109,338, and in England August 8, 1894, No. 15,172.

*To all whom it may concern:*

Be it known that I, ANTHONY PULBROOK, solicitor, a subject of the Queen of Great Britain, residing at 8 Union Mansions, Queens Court Gardens, West Kensington, London, in the county of Middlesex, England, have invented certain Improvements in Inflatable Tires, (for which I have obtained patents in the following countries: Great Britain, No. 15,172, dated August 8, 1894; France, No. 237,516, dated April 3, 1894, and Belgium, No. 109,338, dated April 6, 1894,) of which the following is a specification.

This invention relates to inflatable wheel-tires of bicycles, tricycles, roller-skates, and other carriages, which are composed of air-tight tubes placed one inside the other; and the object is to prevent deflation of the whole tire when an outer tube becomes punctured.
For this purpose I employ the arrangement shown in the annexed drawing, which represents a cross-section of a tire constructed in accordance with my invention.

A B C are air-tight tubes placed one inside the other with air-spaces between and inclosed in an outer air-tight tube or cover E. Each of the internal tubes A B C is provided with a valve T, opening inward, so that when air under pressure is forced into the outer tube or cover E through the charging-valve S it finds its way through the said valves T into the interior of the said internal tubes, and in the event of the outer tube or cover E, or even one or more of the internal tubes, being punctured, the said valves prevent the escape of the compressed air from the internal tubes of such of them as may not have been punctured, and they consequently remain inflated tubes available for use until an opportunity is afforded to repair the punctures in those tubes that may have been deflated.

In the above-described arrangement transverse distance-pieces or partitions may be used in the air-spaces between the tubes, as described in the specification of an application for patent, Serial No. 568,098, of even date herewith, for the purpose of keeping the tubes at proper distances apart, and for subdividing the air-spaces into a number of separate chambers.

I claim—

An inflatable wheel-tire composed of a plurality of tubes of impervious material placed inside one another so as to form laminations with air-tight spaces between them, the inner tube or tubes being provided with a valve or valves T opening inward, and the outer tube with a supply-valve S opening into the air-space between the said outer and next inner tube, substantially as described and for the purposes set forth.

In witness hereof I have hereunto set my hand in presence of two witnesses.

ANTHONY PULBROOK.

Witnesses:
WILLIAM HENRY BECK,
STEPHEN EDWARD GUNYON.